US009825972B2

(12) United States Patent
Seshadri et al.

(10) Patent No.: US 9,825,972 B2
(45) Date of Patent: *Nov. 21, 2017

(54) METHOD AND APPARATUS FOR TRUSTED BRANDED EMAIL

(71) Applicant: JOSE J. PICAZO SEPARATE PROPERTY TRUST, Livermore, CA (US)

(72) Inventors: Harish Seshadri, Fullerton, CA (US); Noel Ruane, Palo Alto, CA (US)

(73) Assignee: Jose J. Picazo Separate Property Trust, Livermore, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/092,254

(22) Filed: Nov. 27, 2013

(65) Prior Publication Data

US 2014/0090044 A1  Mar. 27, 2014
US 2015/0358335 A9  Dec. 10, 2015

Related U.S. Application Data

(63) Continuation of application No. 12/234,054, filed on Sep. 19, 2008, now Pat. No. 8,621,217, which is a continuation of application No. 11/035,476, filed on Jan. 13, 2005, now Pat. No. 7,457,955.

(60) Provisional application No. 60/536,557, filed on Jan. 14, 2004.

(51) Int. Cl.
| G06F 17/30 | (2006.01) |
| H04L 29/06 | (2006.01) |
| G06Q 10/10 | (2012.01) |
| H04L 9/32 | (2006.01) |

(52) U.S. Cl.
CPC ........ *H04L 63/123* (2013.01); *G06Q 10/107* (2013.01); *H04L 9/3236* (2013.01); *H04L 9/3247* (2013.01); *H04L 63/0428* (2013.01); H04L 2209/60 (2013.01); H04L 2209/68 (2013.01); H04L 2209/76 (2013.01); H04L 2209/805 (2013.01)

(58) Field of Classification Search
USPC ............ 713/176, 170, 181, 160, 161; 726/1, 726/12-14, 22-24; 709/201-207; 715/748, 739; 705/51, 54
See application file for complete search history.

(56) References Cited

U.S. PATENT DOCUMENTS

| 6,084,969 A * | 7/2000 | Wright et al. ................. 380/271 |
| 6,707,472 B1 * | 3/2004 | Grauman ............. G06Q 10/107 379/93.24 |
| 6,986,049 B2 * | 1/2006 | Delany ......................... 713/176 |
| 7,107,618 B1 * | 9/2006 | Gordon et al. ................. 726/24 |

(Continued)

FOREIGN PATENT DOCUMENTS

WO  WO 2005052856 A3 *  3/2006  ............... H04Q 7/20

*Primary Examiner* — Mohammed Waliullah

(57) ABSTRACT

A trusted branded email method and apparatus in one aspect detects branded electronic messages and performs validation before it is sent to a recipient. In another aspect, an electronic messages is branded by embedding branding assets and validation signatures. Algorithms that generate validation signatures are dynamically selected to further strengthen the security aspects. Branding assets are presented to a user using a distinct indicia that represents to the user that the branding assets are secure.

18 Claims, 11 Drawing Sheets

(56) References Cited

U.S. PATENT DOCUMENTS

| | | | |
|---|---|---|---|
| 7,457,955 B2* | 11/2008 | Seshadri et al. | 713/170 |
| 7,472,163 B1* | 12/2008 | Ben-Yoseph | G06Q 10/107 |
| | | | 709/206 |
| 8,621,217 B2* | 12/2013 | Seshadri et al. | 713/170 |
| 2003/0023695 A1* | 1/2003 | Kobata et al. | 709/206 |
| 2003/0229672 A1* | 12/2003 | Kohn | H04L 12/585 |
| | | | 709/207 |
| 2005/0015457 A1* | 1/2005 | Warasawa | H04L 12/58 |
| | | | 709/207 |
| 2006/0053293 A1* | 3/2006 | Zager | G06Q 10/107 |
| | | | 713/176 |

\* cited by examiner

METHOD AND APPARATUS FOR TRUSTED BRANDED EMAIL

CROSS-REFERENCE TO RELATED APPLICATIONS

This application is a continuation of U.S. patent application Ser. No. 12/234,054, which in turn is a continuation of U.S. patent application Ser. No. 11/035,476, filed Jan. 13, 2005, which claims the benefit of U.S. Provisional Patent Application No. 60/536,557 entitled Method and Apparatus for Trusted Branded Email, filed on Jan. 14, 2004. All of the foregoing applications are incorporated entirely herein by reference.

TECHNICAL FIELD

The present application relates to processing branded electronic mails in a secure manner.

BACKGROUND

The exchange of emails across organizations or from an organization to an end user are widely accepted and promoted business practices. B2B (Business to Business) email exchanges, and the delivery of targeted email to end users, are practices that are growing exponentially across business enterprises. Organizations can promote their brand through these types of email campaigns. In order to enforce the value of a brand and promote brand email campaigns, email messages can include branding assets together with the contents of the email. Branding assets are basically media constructs like a company logo (image or movie), company sound effects, or any other media that promotes a company's brand. Moreover, branding assets can also be any additional artifacts used for promoting business driven email campaigns. Branding assets or references to the assets are typically embedded within the email header. In order to reliably execute brand email campaigns, the brand mail that includes branding assets and the message content should be inviolable, for example, thereby enforcing the integrity of the brand. By enforcing brand integrity, brand-specific campaigns/scenarios can be executed adding to the value of an organization's brand. However, if brand integrity is compromised, there could be serious repercussions for an organization's brand, for example, brand value deflation.

The brand mail system addresses these concerns by allowing organizations to execute branding email campaigns reliably, efficiently and securely. But why should BrandMail be secure? Brand mail should be secure because of the importance of "brand-value" for an organization or an entity. "Brand-Value" is enforced by preserving the integrity of branded emails. The brand email integrity is preserved by making the email tamper-proof and unforgeable. If tampering or forging occurs the value of an organization's brand may deflate significantly.

Organizations exchanging brand mail(s) can be assured that both parties are truly communicating between each other (no forging of a message) and that the mail contents have not been tampered with. The same applies to the scenario where a branded mail is sent from an organization (for example, hp.com) to an end-user registered within a web mail system (for example, Yahoo, Hotmail). In order for the brand mail system to be a reliable trust mechanism it should address main security concerns.

SUMMARY

Method and apparatus for trusted branded email is provided. In one aspect, the method includes receiving a branded electronic mail and retrieving an algorithm index from the branded electronic mail. An algorithm is dynamically selected using the algorithm index, and the algorithm is used to generate a validation signature. A tamper proof digest from the branded electronic mail is retrieved and compared with the generated validation signature. If the tamper proof digest matches the validation signature, the branded electronic mail is transmitted to a recipient.

In another aspect, the method includes presenting the branded electronic mail with a visual distinction to the recipient. The visual distinction may be a branding asset associated with a sender of the branded electronic mail such as a logo, moving images, movie, or sound effect that, for example, identifies the sender.

Yet in another aspect, the system in one embodiment includes a writer subsystem that composes the secure branded email including a tamper proof digest and a reader subsystem that validates the tamper proof digest to ensure that the branded email has not been tampered with.

Further features as well as the structure and operation of various embodiments are described in detail below with reference to the accompanying drawings. In the drawings, like reference numbers indicate identical or functionally similar elements.

DETAILED DESCRIPTION

The method and apparatus of the present application in one embodiment includes a brand mail system that addresses the security concerns such as forging, tempering, and cryptography in electronic communications. A classic example of forgery is when a black hat impersonates some organization or entity, and sends deceptive email message(s) to an end user.

Briefly, a black hat describes a hacker who performs hacking operations such as breaking into a computer system(s) or network(s) with malicious intent. Hackers perform their operations ("crimes") clandestinely. Unlike a white hat hacker, the black hat hacker takes advantage of the break-in, perhaps destroying files or stealing data for some future purpose. The black hat hacker may also make the exploit known to other hackers and/or the public without notifying the victim. This gives others the opportunity to exploit the vulnerability before the organization is able to secure it. They also forge data and tamper with existing data with the aim of disrupting business processes. A white hat describes a hacker who performs hacking for legitimate reasons. Typically white hats are very qualified and contribute their knowledge to secure existing systems.

By instilling a trust mechanism, parties exchanging emails will be more confident about the source of the message(s). The brand mail system addresses this problem, for example, by detecting the forgery/tampering of an email message.

A classic "tampering-with" scenario is when a black hat decides to intercept an email message and tamper with the contents of the email. The black hat then could modify any part of a message. This kind of tampering is known as a "man in the middle" (MITM) attack. The tamper proof mechanism of the present application in one embodiment addresses this problem, for example, by validating the email message signature via a TPD thus enforcing the data integrity of the message. TPD, in one embodiment, is a base-64 encoded tamper proof digest, which is a brand validation signature. In one embodiment, the tamper-proof mechanism (TPD generation/validation) provides a trust mechanism for brand mail.

There are many existing industry strength mechanisms that perform email cryptographic operations such as SSL/TLS, S/MIME, and PGP—(PKI solutions). The PKI solutions listed above can also be used to secure brand mail messages. However, the present application provides an optional high-performance lightweight symmetric key cryptographic system based on dynamic algorithmic selection based on a generated algorithm index. It is left to the organizations communicating, for example, those exchanging brand mails to configure their brand mail system for cryptographic communication.

Figure 1:
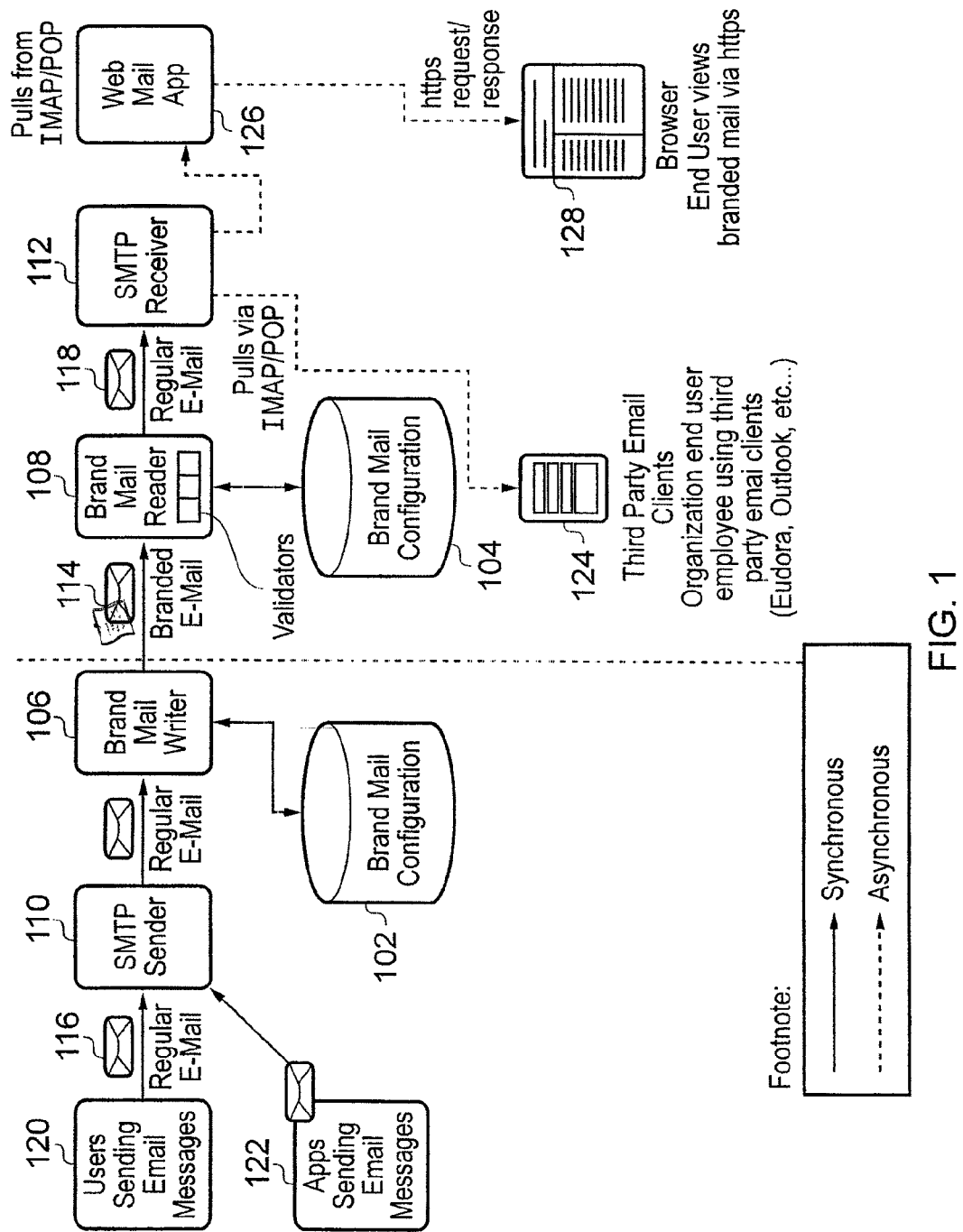
FIG. 1 is an architectural diagram illustrating a brand mail system of the present application in one embodiment.

FIG. 1 is an architectural diagram illustrating an overview of a brand mail system of the present application in one embodiment. In one embodiment, a brand mail system of the present application acts as a lightweight, robust, extensible, scalable, and efficient trust mechanism. In one embodiment, a brand mail system of the present application sits between conventional communication systems such as an SMTP sender 110 and an SMTP receiver 112. A brand mail system in one embodiment may include a BrandMailWriter 106 and a BrandMailReader 108, subsystems functioning to allow for the delivery of branded emails. In one embodiment, the subsystems that perform the reading and associated functions, and writing and associated functions are referred to as BrandMailReader 108 and BrandMailWriter 106. However, the actual names of the subsystems are not critical, rather any other software, firmware or hardware systems or subsystems may be used to perform the similar functions of the reader and the writer. A BrandMailReader 108 in one embodiment is a subsystem generally responsible for receiving an email message and detecting whether an email message is branded or not. It may be a configurable email proxy that receives either a regular email message branded message 114. If it is a regular email message, then the role of the BrandMailReader is to redirect or forward the message 118 to a designated SMTP receiver email server 112 within the respective organization. If it is a branded message 114, the BrandMailReader passes the branded mail through validation processors utilizing branded mail configuration 104.

During the validation processing, errors may be generated and handled. If the validation is successful, the message is forwarded to a designated SMTP receiver email server 112 while preserving the integrity of the branded mail.

A BrandMailWriter 106 in one embodiment is a subsystem that is responsible for sending a branded email message 114. Utilizing brand mail configuration 102, the BrandMailWriter 106, for example, embeds references to branding assets or the assets themselves within the branded email. The BrandMailWriter 106 also signs the message with a TPD to ensure the integrity of the branded email message. Optionally, it can also encrypt the email message body with the generated cryptographic key.

The BrandMailWriter 106 in one embodiment is a configurable email proxy that fabricates a branded email message from a regular email message 116 (i.e. the emails are originally sent by email users 120 or applications 122). The branded message is sent to the BrandMailReader 108, then to the appropriate targets such as email clients 124, web mail applications 126, and browsers 128.

The BrandMailWriter 106 and the BrandMailReader 104, in one embodiment, utilize a brand mail cryptographic system for optionally encrypting and decrypting email messages. A brand mail cryptographic system in one embodiment is an optional, configurable, lightweight symmetric key cryptographic system. In one embodiment, encryption of a branded mail message happens within the BrandMailWriter; decryption of the message happens within the BrandMailReader. The BrandMailWriter uses the generated cryptographic key to encrypt the mime body parts of the message. The algorithm selected is based on the algorithm index generation specific to the e-mail message. After the BrandMailWriter 106 composes an encrypted message, it ultimately sends the message to the destination BrandMailReader 104. The BrandMailReader 104 detects the brand mail cryptographic tag, which indicates that the message is encrypted and needs to be decrypted. Upon detection, the BrandMailReader 104 decrypts the message content using the algorithm index to select the decryption algorithm using the generated cryptographic key. The BrandMailReader 104 then proceeds to TPD validation. In one embodiment, if a cryptographic tag is not detected, the BrandMailReader 104 proceeds directly to TPD validation.

Figure 2:
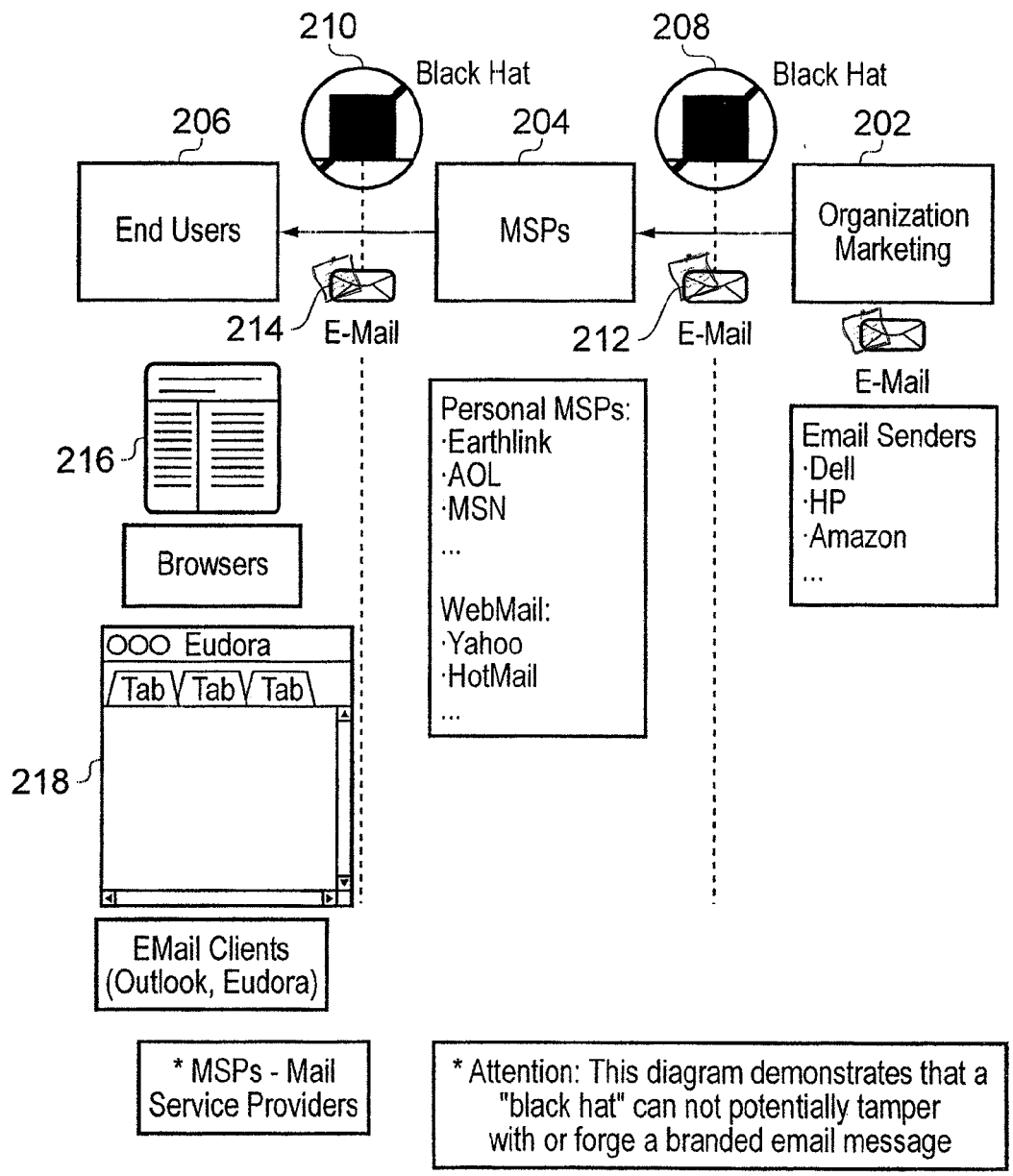
FIG. 2 is a topology diagram illustrating a secure brand mail system of the present application in one embodiment.

FIG. 2 is a topology diagram illustrating a secure brand mail system of the present application in one embodiment. Emails 212 sent from organizations 202 to end users 206 typically pass through MSPs 204. End users 206 receiving the emails 214 typically view the messages using a browser 216 or email clients 218. The brand mail system of the present application can reside between the organization's email sending system 202 and end user's email system and protect the messages from potentially dangerous black hats hackers 208 by validating the messages.

Figure 3:
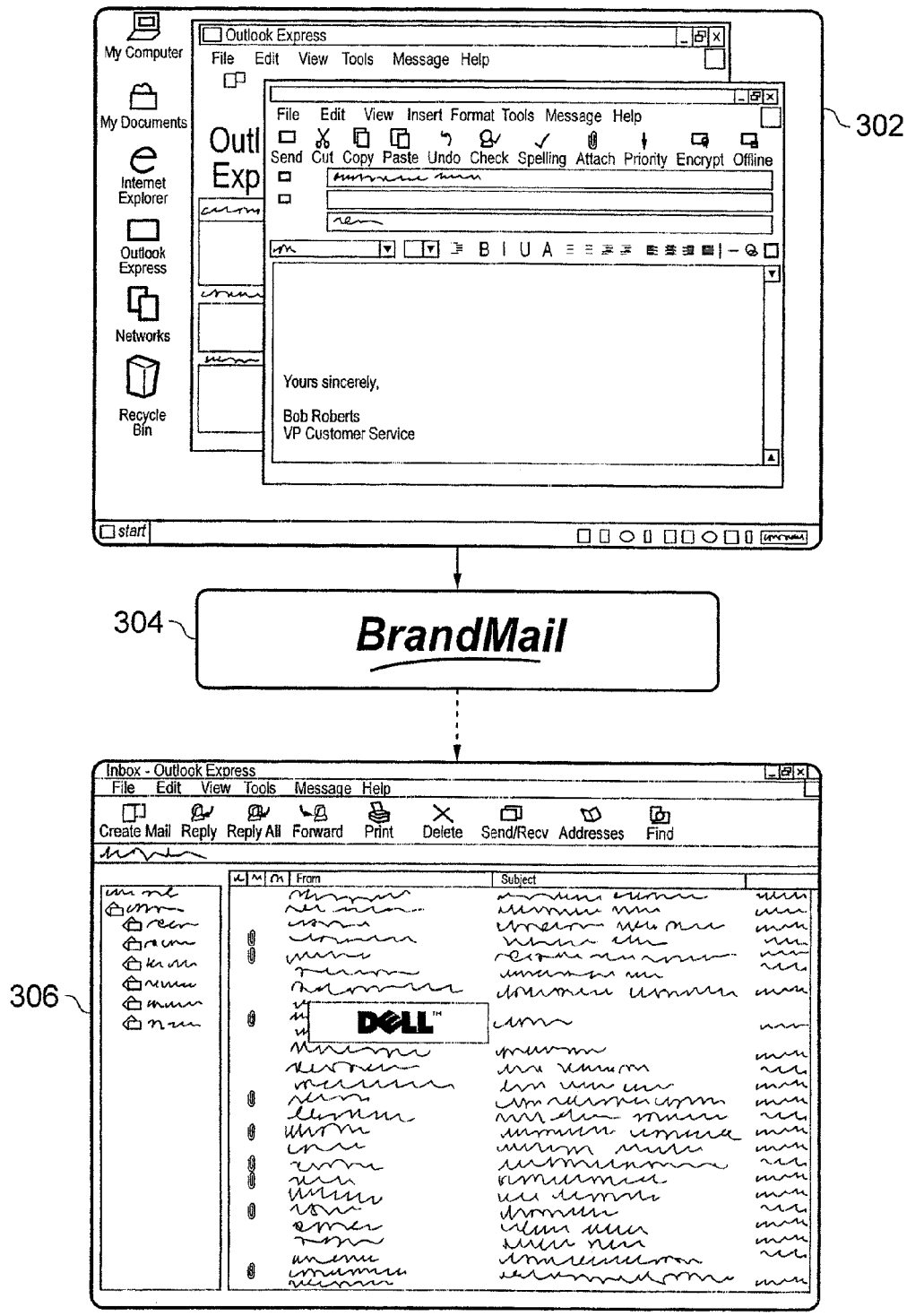
FIG. 3 is a high-level diagram illustrating an organization-to-organization use case of the present application in one embodiment.

FIG. 3 is a high-level diagram illustrating an organization-to-organization use case of the present application in one embodiment. In this example, a sender from organization X sends a branded mail to a receiver from organization Y. For instance, a sender using known electronic mail systems 302 can write an email message and send the email to an organization Y's receiver. The brand mail system 304 of the present application in one embodiment, for example, using a BrandMailWriter and BrandMailReader subsystems, which will be explained in detail below, transforms the regular email into branded mail and delivers it to the email communication endpoint. At 306, organization Y's receiver views the branded email that the organization X's sender sent. The present application provides a visual distinction, for example, in the form of a company brand logo (in the user's inbox) that indicates that the e-mail is secure. This shows that by displaying a trademark also conveys a trustmark (since the e-mail is secure). The BrandMail system is capable of enacting any visual distinction anywhere within the email so that it represents a trustmark. The visual distinction provided by the present application may be any indication that would convey to a user that the email is secure, for example, that it passed a security check. Some examples of the visual distinction may include a particular color indication associated with the email in an inbox, a particular picture or symbol, or even a predetermined sound, tactile or textual indicia associated with the email. Indicia may be included in a particular field of an inbox display or presentation. The particular field of an inbox may be an existing field or a newly added field used for the indicia. Thus, when a user sees or hears (or feels) the particular indicia associated with the email, the user knows that the email is secure.

In one embodiment, when using third party email clients, a plug-in/COM add-in may be created to process the branding assets. In one embodiment, the plug-in/COM add-in is the visual processing component of the BrandMail system. It can securely render the branding assets (i.e. displaying the logo) of the branded e-mail. The plug-in/COM add-in can read the headers of new mail and based on the fundamental brand mail headers, for example, certain predetermined fields of the brand mail headers, can determine that it is a brand mail. The plug-in/COM then can read the standard visual branding assets such as bm_logo and bm_sound_effect, for example, contained in the brand mail header.

Generally, branding assets refer to any asset that enforces a brand such as a logo (for example, a company logo) or sound effects (audio) that represent a company. The logo can either be an image or a movie (for example, a QuickTime movie such as Intel Inside) or both. Branding assets can also include criteria that promote branding business processes such as additional assets for logging, metrics analysis, filtering, rating, rules, and anti-spam tactics. Brand assets are usually embedded within the email header, but can optionally be embedded as a mime body part. The brand asset format usually is preceded by a brand mail asset prefix (for example, bm_). A brand asset header entry can contain resources, and/or references to resources. The resources can either be text resources or network reference resources. Text resources can be any tag containing text values. For example text resources can be descriptions, relative paths, digests as text, meta-tags, formatted rules, etc.

An example of a text resource is a brand asset that provides a description of a company's mission statement. The header entry is shown below:

bm_mission_statement=To become a global leader in the industry for email CRM development On the other hand network reference resources provide references to network resources. Examples of such are hyperlinks (URLs/URIs), RDF, JNDI, Web services, etc. An example of a network resource is a brand asset that represents a company's logo. A logo is a major depiction of a brand, thus logos are displayed to represent the company and its brand. The header entry is shown below:

bm_logo=www.hp.com/media/images/logo.gif
or
bm_logo_movie=www.hp.com/media/movies/logo.mov In one embodiment, header assets such as bm_logo (image) can be registered as a standard visual brand mail asset and every brand mail will be checked for the existence of a secure logo header entry. A method and system of the present application in one embodiment, first checks to see if it can find a bm_logo header entry. If the entry exists then it uses it as the logo asset. If the logo asset is not found then the system knows that it is not dealing with a branded mail.

After reading the branding assets, the plug-in/COM can pull in the associated media, for example, by making the URL (universal, resource locator) requests to the paths provided for the brand mail. This case implies that the email client (for example, Eudora, Outlook) user is online and connected to the Internet. In one embodiment, each time the user connects to the Internet, the media is updated and cached locally for the given domain. This way, even if a end-user using an email client such as Outlook is not online, an end user still can get to experience the cached media such as logos and sound effects.

Figure 4:
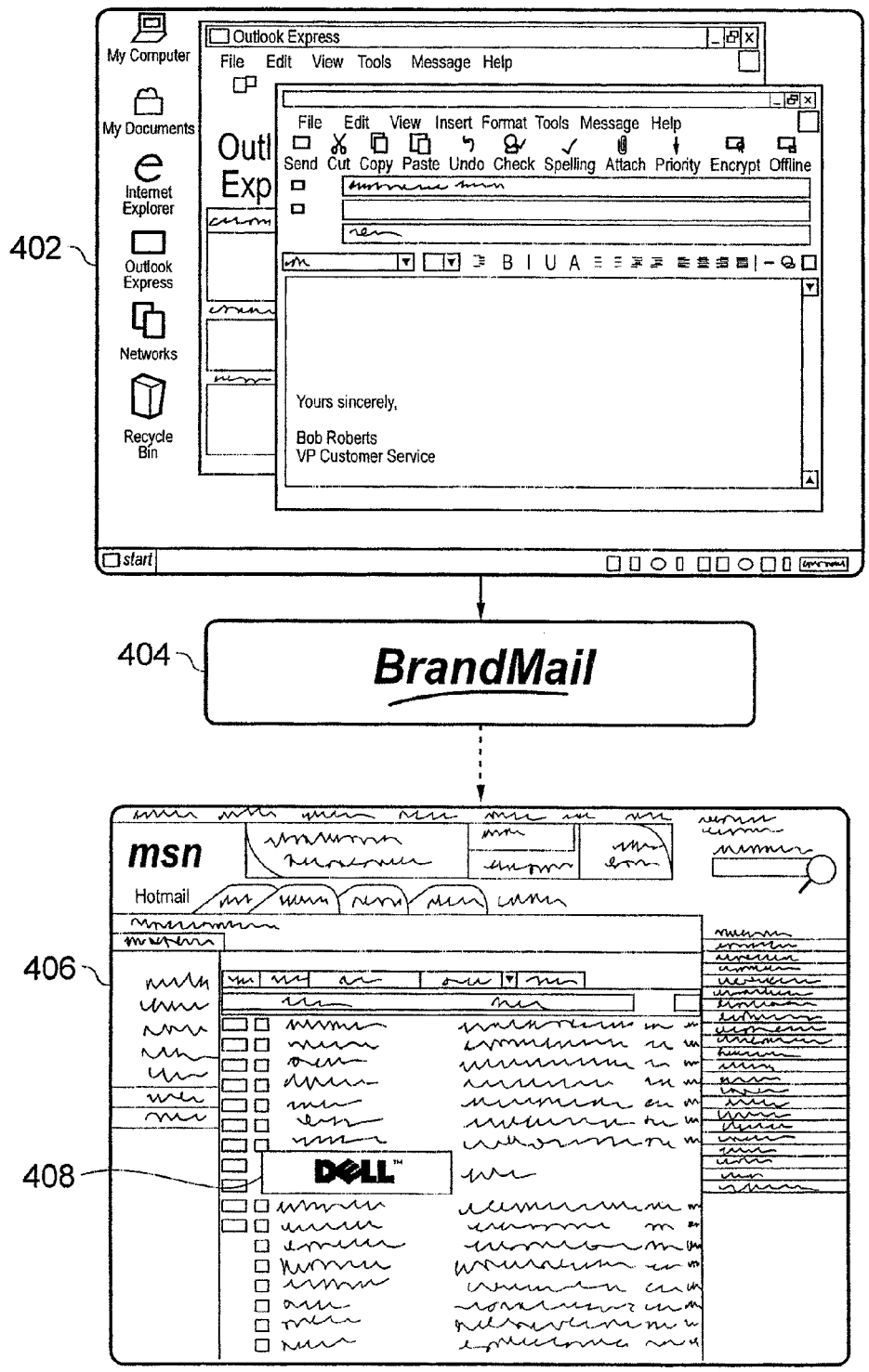
FIG. 4 is a high-level diagram illustrating an organization to web mail end user use case of the present application in one embodiment.

FIG. 4 is a high-level diagram illustrating an organization to web mail end user use case of the present application in one embodiment. As shown at 402, organization X's sender writes an email and sends the email to web mail user receiver. At 404, the brand mail system of the present application in one embodiment transforms the regular mail into branded mail and delivers it to the email communication endpoint, for instance, using BrandMailWriter and reader subsystems. At 406, the web mail user receiver views the branded email that organization X's sender sent.

In one embodiment, a web mail application 406, for instance a third party web mail application, which typically makes use of dynamically generated web pages, gets all mail messages for the particular folder. If there are any brand mail messages, the web mail application's protocol can be changed from http to https. Optionally, the web mail application can always run https. In one embodiment, for each brand mail message, the web mail application may run any domain specific rules, for example, implemented as Java script that executes any other code fragments like jsp (JavaServer Pages), asp (Active Server Pages) page fragments, which may be embedded as branding assets in the e-mail header, on the branding assets if applicable, and display a logo and process any other media such as playing sound effects, if applicable. In one embodiment, brand assets such as the logo are pulled in to the view by making requests to the bm_logo or bm_logo_movie URL. FIG. 4 illustrates an inserted logo ("DELL") 408 with the received brand mail. FIG. 4's logo 408 is an example of a visual distinction provided in the present application. A display of the logo 406 in the inbox as shown, for example, manifests to a user that this branded email is a secure message, so that the user can safely open the message. Companies are assured that their logo has not been tampered or otherwise hacked.

Figure 5:
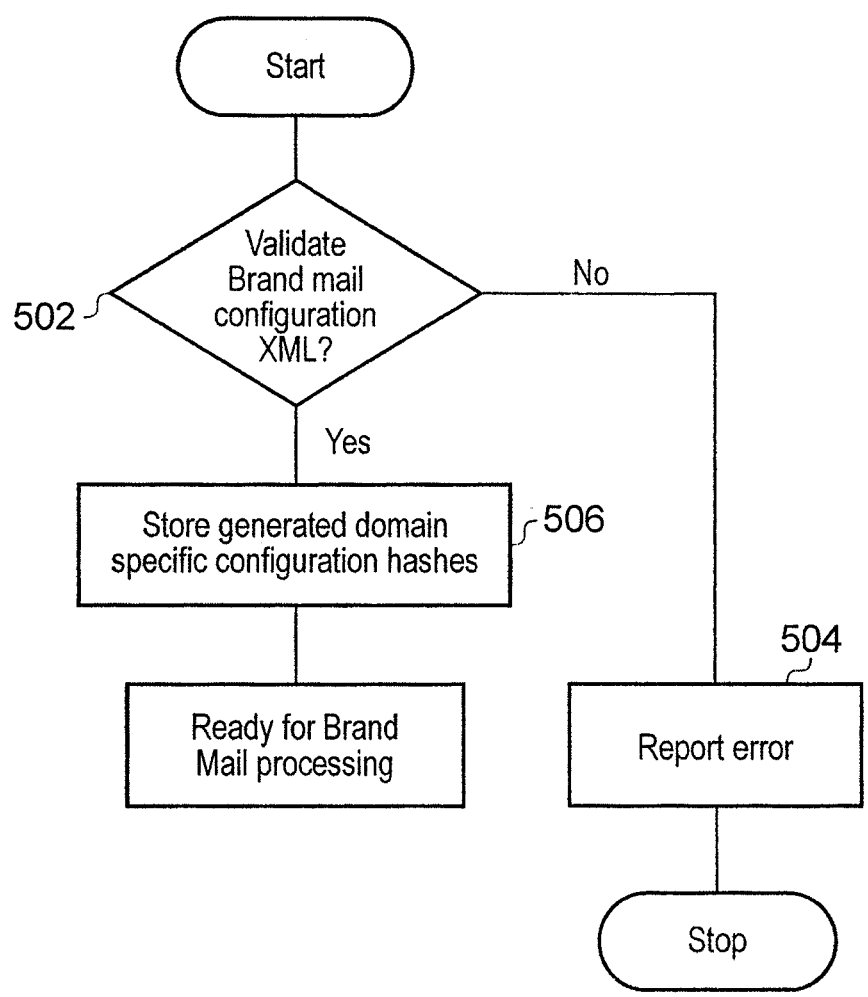
FIG. 5 is a flow chart illustrating a brand mail application startup of the present application in one embodiment.

FIG. 5 is a flow chart illustrating a brand mail application startup of the present application in one embodiment. At 502, when a brand mail application subsystem such as a BrandMailWriter or a BrandMailReader starts up, a brand mail configuration XML file is validated. The XML file validation generally checks to see if all the necessary configuration nodes exist, and that they contain valid values. It also checks, for example, the integrity of XML via DOM (Document Object Model and XML schema validation. At 504, if the configuration is invalid, the application logs the configuration errors and exits gracefully. If the configuration is valid, at 506, the configuration data is loaded, for instance, into efficient memory data structures for access during the run time mail processing. The brand mail configuration may include system wide configuration constructs as well as domain specific configuration constructs.

The valid domain specific configurations are hashed and stored for the given domain, in one embodiment, each domain configuration node in the XML is converted into a DomainConfigurationObject. A mapping is created in memory that associates this domain configuration with its corresponding hash. This mapping is also stored, for instance, within an efficient memory data structure for run-time mail processing access. Aspects such as the ordering of hash classes, cryptographic key generation classes and cryptographic classes are preserved by the hashing of the domain specific configuration.

A domain specific configuration, for example, contains a mapping of domain names to attributes that are domain specific. The domain specific configuration in one embodiment contains a base-64 encoded policy hash, defines brand assets specific to the domain, hashing, cryptographic key generation, and cryptographic algorithms (for example, all indexed with the natural order of the definition (the order that the cryptographic algorithm definitions appear in the configuration file), a flag for using optional constructs such as cryptography, and log directory configurations for valid/invalid TPD emails.

Below is an example of the XML domain configuration that is representative of the domain specific configuration object model:

```
<domain name="intel.com">
    <policy
value="c3d6a2ffb6e4c6a3d744d2e8b24fa1da"/>
        <brand-assets>
            <brand-asset name="bm_logo"
value="http://www.intel.com/images/intel_logo.gif
"/>
            <brand-asset name="bm_sound_effect"
value="http://www.intel.com/sounds/intel_sound.wa
v"/>
        </brand-assets>
        <hash-classes>
            <hash-class
name="com.brandmail.algorithms.hash.MD5Hasher"/>
            <hash-class
name="com.brandmail.algorithms.hash.SHA1Hasher"/>
        </hash-classes>
        <use-cryptography value="true"/>
        <cryptographic-key-generation-classes>
            <class
name="com.brandmail.algorithms.cryptography.keyge
neration.ModulusKeyGenerator"/>
            <class
name="com.brandmail.algorithms.cryptography.keyge
neration.DivisionKeyGenerator"/>
        </cryptographic-key-generation-classes>
        <cryptographic-classes>
            <cryptographic-class
name="com.brandmail.algorithms.cryptography.Tripl
eDES"/>
            <cryptographic-class
name="com.brandmail.algorithms.cryptography.BlowF
ish"/>
        </cryptographic-classes>
        <tpd-valid-directory
name="/intel.com/TPD/valid/"/>
        <tpd-invalid-directory
name="/intel.com/TPD/valid/"/>
    </domain>
```

Other domain configurations are possible. For example, additional definitions or nodes may be added to the domain configuration or the existing ones modified.

Configuration file contains a configuration for the subsystem of interest. It defines a subsystem type that should be configured as for example, BrandMailReader or BrandMailWriter. It also encapsulates all the domain specific configurations. Thus, for example, a BrandMailReader or BrandMailWriter subsystems access their respective configuration files. Below illustrates an example configuration:

```
<configuration>
    <subsystem type="BrandMailWriter"/>
    <domain-specific-configuration>
```

-continued

```
        <domain name="intel.com">
            . . .
        </domain>
        . . .
    </domain-specific-configuration>
</configuration
```

Like the domain specific configuration, more configuration nodes can be added or the existing ones modified.

In one embodiment, the brand mail system of the present application ensures that the brand mail algorithm index dereferences the right index for hashing, cryptographic key generation, and/or cryptography between the BrandMailWriter and reader systems. For example, in the case of cryptography, if the algorithm index de-referenced different non-corresponding algorithms (for the writer and reader respectively), the decryption of the mail would be invalid due to the BrandMailReader/writer configuration mismatch. That is, the writer would encrypt with a specific algorithm class while the reader would decrypt using a different algorithm class. Therefore, the data would be designated as corrupted, and there may not be an easy way to discern a configuration mismatch from a tampering/forging scenario.

In order to make the distinction between a configuration mismatch from a tampering/forging scenario, the brand mail system of the present application in one embodiment checks for the equality of the configuration hashes of BrandMailReader and writer. In one embodiment, the domain specific configuration hash is used to validate the BrandMailWriter's configuration against the BrandMailReader's configuration. In one embodiment, the BrandMailWriter writes its configuration hash into the mail headers and the BrandMailReader validates its configuration against BrandMailWriter's value. If the values match then processing continues otherwise errors are logged and processing stops.

In one embodiment, the brand mail system of the present application provides multiple domain specific algorithms, for example, hash algorithms, key generation algorithms, cryptographic algorithms, for instance, to increase the security of the system. In one embodiment, every branded email, which may have a good degree of uniqueness, generates an algorithm index (checksum), which is used to de-reference the number of algorithms configured. As the number of algorithms configured increases, the unpredictability of what algorithm is chosen (by the algorithm index) for the given branded email also increases. The degree of unpredictability is attained by performing the following modulus operation:

[algorithm_index]%[# of registered algorithm classes]

This unpredictability makes it difficult for black hats to break the brand mail system. To further better the security of the system, it is recommended to tweak or add code to the existing industry-strength algorithms in a manner that is reliable and efficient. By doing this, black hats cannot count in having the exact algorithm for breaking the system.

Figure 6A:
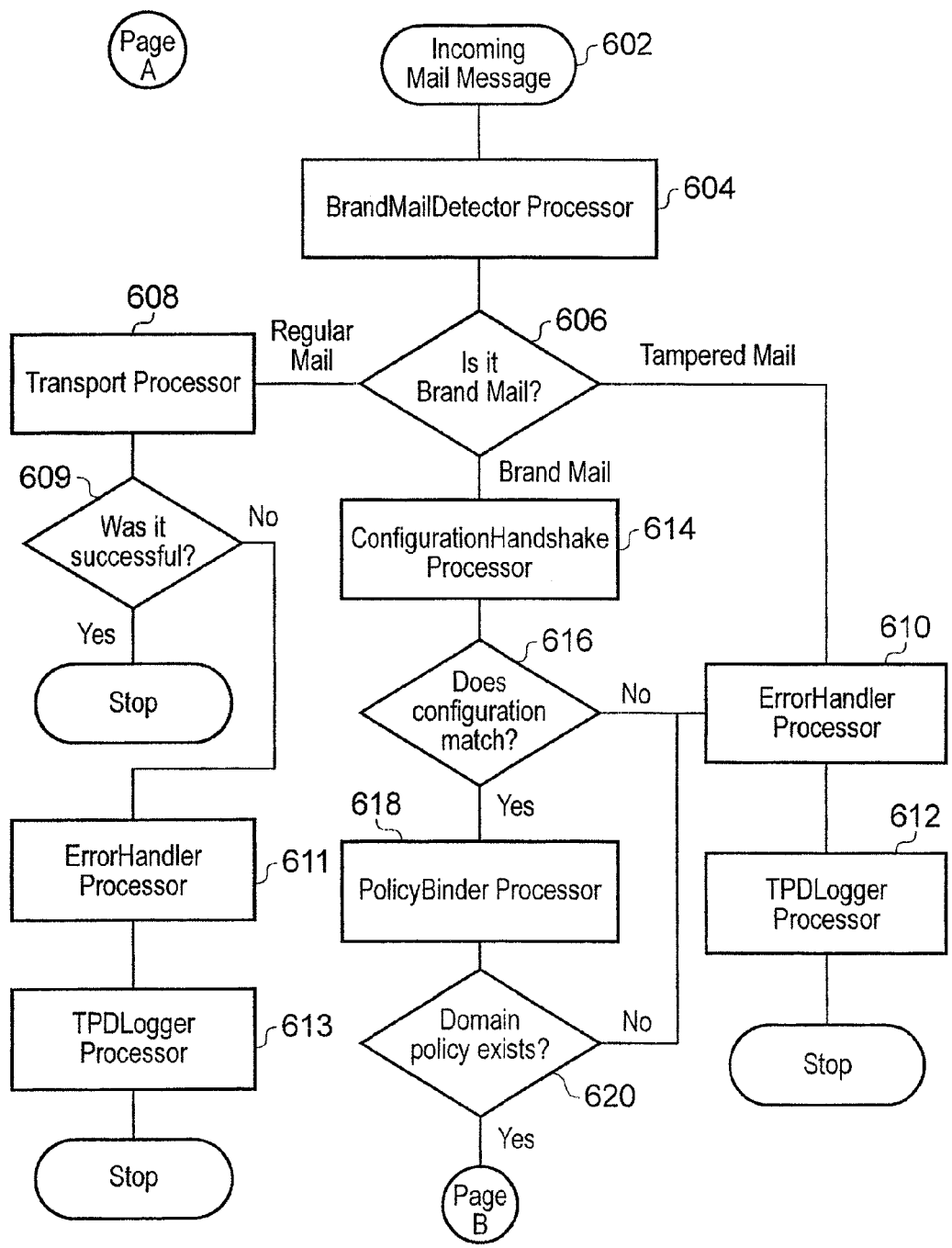
FIGS. 6A, 6B, and 6C are flow charts illustrating a BrandMailReader of the present application in one embodiment.
Figure 6B:
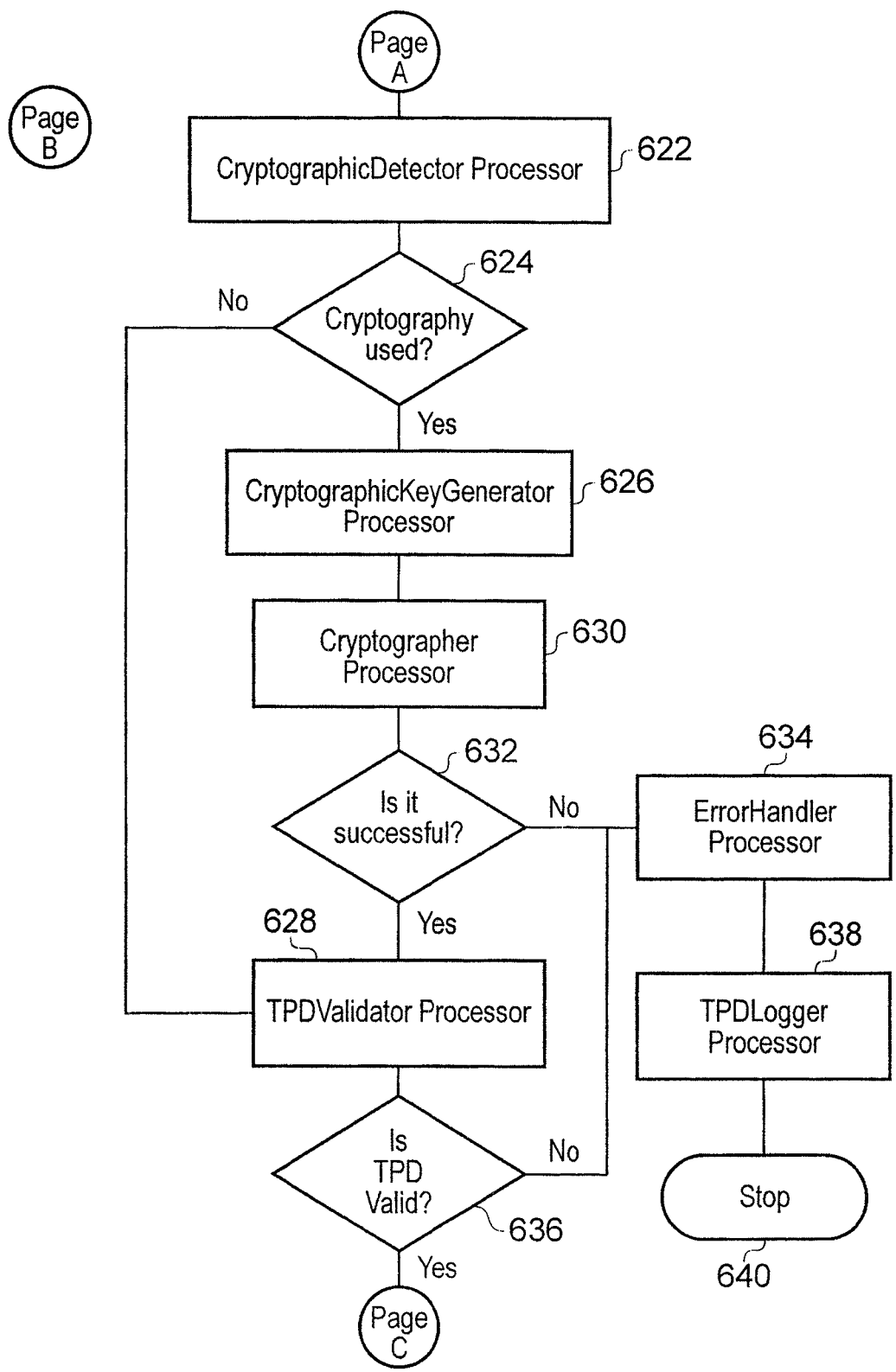
Figure 6C:
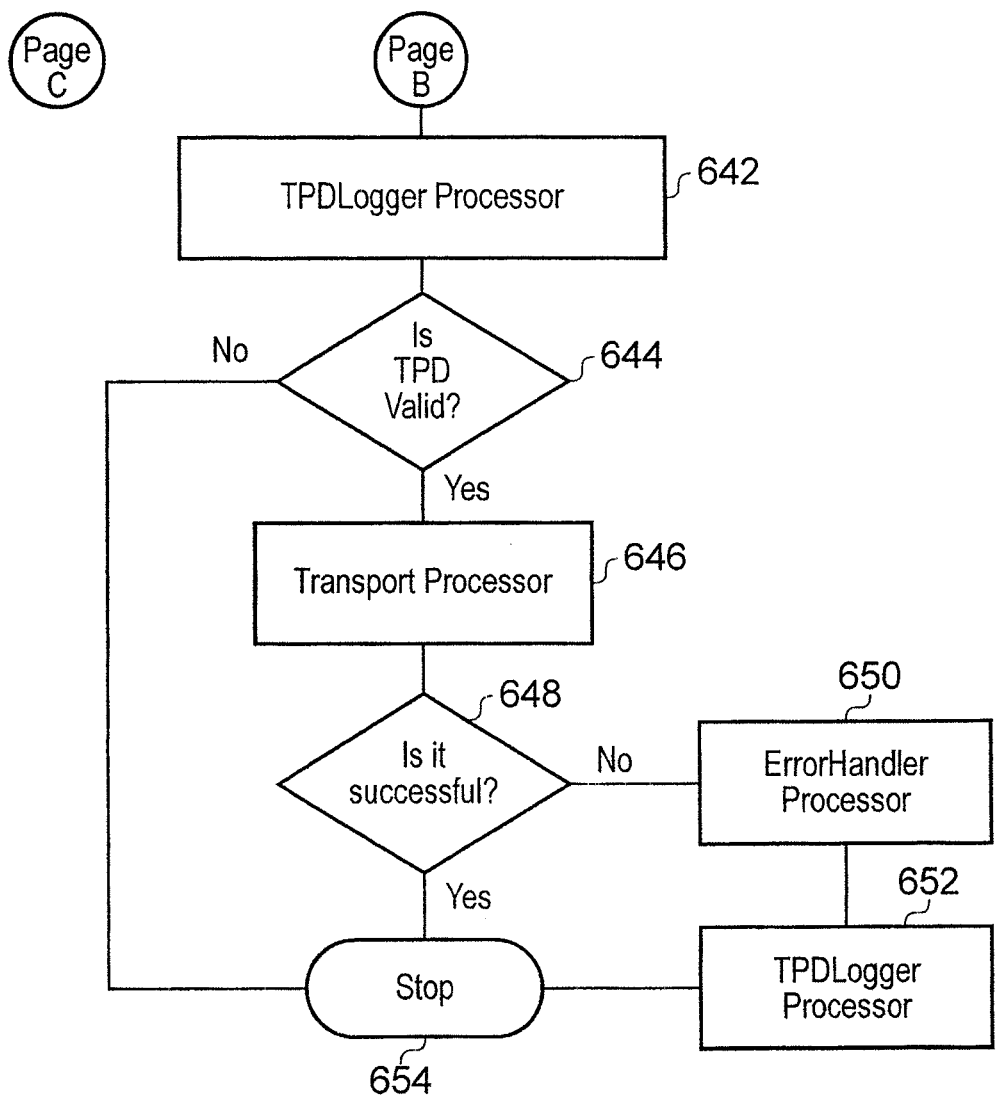

FIGS. 6A, 6B, and 6C are flow charts illustrating a BrandMailReader of the present application in one embodiment. At 602, a message that is sent, for example, by the BrandMailWriter is received by the BrandMailReader email proxy. At 604, a BrandMailDetector Processor performs a detection that diagnoses the following information: whether the mail message is branded message or just simply a regular message. The detection in one embodiment is performed by reading the header entries and seeing if the email headers contain all of the fundamental brand mail headers. The fundamental brand mail headers in one embodiment include the following:

bm_domain_config header entry
    bm_tpd header entry
    bm_index header entry
    bm_written_time header entry
    bm_logo header entry In one embodiment, all of the fundamental brand mail header entries must exist (both the key/value pairs of the header entries) for the mail to be considered as a branded mail at 606. If all the fundamental brand mail header entries exist then the processing/validation of the brand mail continues. If none of the fundamental brand mail headers exist then the reader determines that it is dealing with a regular message. At 608, regular mail messages are simply redirected to the adequate SMTP receiver through the Transport Processor. At 609, if the send was successful, the processing stops. Otherwise, appropriate error handling and logging is performed at 611 and 613 for the message.

There is a case where only some of the fundamental brand mail headers are embedded. In one embodiment, if this is the case then it is determined that the message has been tampered-with. Consequently the processing for the message stops with appropriate error handling at 610 and the message is logged at 612 as invalid brand mail. Other methods to detect whether a message is a branded mail can be utilized, including, for example, setting a flag, setting a minimum number predetermined fields, etc.

If the message is a branded mail, at 614, ConfigurationHandshake Processor makes sure that the domain configuration of the writer matches the domain configuration of the reader. This is done by checking the brand mail header "bm_domain_config" field value against the domain specific configuration hash of the reader.

The domain specific configuration hash for the reader is, for example, generated and stored on application startup. For example, the domain configuration hashes were created during server startup of the reader and writer and the hashes are the same for the email sender and email receiver to exchange information. If at 616 there is a configurations match then the processing continues to 618, otherwise the processing branches to a BrandMailException indicating misconfiguration, and performs error handling at 610.

At 618, a PolicyBinder Processor gets the mapping between the "from" domain name and the base-64 encoded policy hash from the brand mail configuration and subsequently binds the policy hash as a mail processing attribute. In one embodiment, the policy hash designates the contractual agreement between both parties exchanging e-mails. This makes the communication secure between both parties. In one embodiment, it is used as the core symmetric key. In one embodiment, a default implementation makes use of a XML file in the file system. Below is an example of the XML node that is configured in the brandMailConfiguration.xml file:

```
<domain name="hp.com">
...
    <policy value="b8a3021de82f3e01db57b9aec4d31252"/>
...
</domain>
<domain name="support.hp.com">
...
<policy value="c3d6a2ffb6e4c6a3d744d2e8b24fa1da"/>
...
```

```
</domain>
<domain name="dell.com">
...
<policy value="82f3e01db57b9ab6e4c6a3d76a2ffb6e"/>
...
</domain>
```

The PolicyBinder processor at 618, in one embodiment, grabs the policy hash using the "from" domain as the key. This is done, for example, by invoking the method "String bindPolicy( . . . )," which returns the policy hash of interest or throws a PolicyNotFoundException if a policy hash is not found. The policy hash entry is then bound as a mail attribute. The binding in one embodiment is a mapping record between the current mail processing thread, the mail mime message, and a map of attributes.

If at 620, a policy hash is not found, the processing branches to 610 for error handling and exits. If at 620, a policy hash that maps to the domain is found, the processing continues to CryptographicDetector at 622 shown in FIG. 68. CryptographicDetector Processor, in one embodiment, in the context of the BrandMailReader, employs a cryptographic detector that invokes the method "boolean shouldApplyCryptographyForReader( . . . )". This method checks to see if the "bm_cyph" header entry exists and its corresponding value is set to true. If this is the case the processing continues for cryptographic decryption, otherwise cryptography does not apply.

Thus, at 624, if cryptography is used, for instance, "bm_cyph" header entry with its corresponding value set to true was found, the processing continues to 626. Otherwise, the processing branches to TPDValidator Processor at 628.

At 626, CryptographicKeyGenerator Processor generates a cryptographic key and binds it as a mail attribute. The cryptographic key will then be used by the cryptographer processor at 530. In one embodiment, the algorithm selection for a cryptographic key is based on the algorithm index ("bm_index" header entry). There is a collection of registered cryptographic key generation algorithms as classes implementing the CryptographicKeyGenerator interface. In one embodiment, the classes are configured for each domain. Below is an example of the XML node that is configured in the brandMailConfiguration.xml file:

```
<domain name="hp.com">
...
    <cryptographic-key-generation-classes>
        <class name="com.brandmail.algorithms.cryptography.keygeneration.DivisionKeyGenerator"/>
        <class name="com.brandmail.algorithms.cryptography.keygeneration.ModulusKeyGenerator"/>
    </cryptographic-key-generation-classes>
...
</domain>
```

In one embodiment, the same order of the domain specific cryptographic key generation classes is maintained within the configuration of the BrandMailWriter. If this does not happen there may be an algorithm mismatch between the writer and the reader. In order to select the true algorithm index in the collection the following modulus operation is performed:

bm_index % [# of registered cryptographic key generation classes]

This gives the true index to dereference the appropriate cryptographic key generation class within the collection. The method "byte[ ] generateCryptographicKey( . . . )" is invoked by the selected cryptographic key generation class and the return value representing the generated key is bound as a mail attribute for the respective mail request. The mail attribute is called "cryptographic_key". This key is subsequently used by the Cryptographer processor to perform any cryptographic operations.

At 630, a Cryptographer Processor decrypts the message body parts. In one embodiment, it uses the "cryptographic_key" mail attribute as the key to decrypt the mime body parts. The algorithm selection in one embodiment is based on the algorithm index ("bm_index" header entry). There is a collection of registered cryptographic algorithms as classes implementing the Cryptographer interface. The classes should be configured for each domain. Below is an example of the XML node that is configured in the brandMailConfiguration.xml file:

```
<domain name="hp.com">
...
  <cryptographic-classes>
    <class
name="com.brandmail.algorithms.cryptography.BlowFish"/>
    <class
name="com.brandmail.algorithms.cryptography.TripleDES"/>
  </cryptographic-classes>
...
</domain>
```

In one embodiment, the domain specific cryptographic classes are maintained within the configuration of the BrandMailWriter. Otherwise, there may be an algorithm mismatch between the reader and the writer. In order to select the true algorithm index in the collection the following modulus operation is performed in one embodiment:

bm_index %[# of registered cryptographic classes]

This gives the true index to dereference the appropriate cryptographic class within the collection. Once the cryptographic class is selected, the "byte [ ] decrypt( . . . )" method is called for all the mime body parts. In case of any problems a BrandMailException is thrown and errors are processed via the ErrorHandler processor. At 632, if the decryption was successful, the processing continues to TPDValidator Processor at 628. Otherwise, the processing branches to ErrorHandler Processor at 634 and appropriate logging at 638.

The TPDValidator Processor at 628 validates the TPD for the message. In one embodiment, to validate the TPD, this processor makes use of the following constructs in one embodiment:

Algorithm index (The "bm_index" header entry which is embedded in the email headers)

The collection of registered TPD algorithms as classes implementing the Hasher interface. The classes should be configured for each domain. Below is an example of the XML node that is configured in the brandMailConfiguration.xml file:

```
<domain name="hp.com">
...
  <hash-classes>
    <class
name="com.brandmail.algorithms.hash.SHA1Hasher"/>
    <class
name="com.brandmail.algorithms.hash.MD5Hasher"/>
  </hash-classes>
...
</domain>
``` in one embodiment, the same order of domain specific hash classes are maintained within the configuration of the BrandMailWriter. If this does not happen there may be an algorithm mismatch between the writer and the reader. In order to select the true algorithm index in the collection the following modulus operation is performed in one embodiment: bm_index %[# of registered hash classes]

This provides the true index to dereference the appropriate hash class within the collection. Because the algorithm index is not the same for all message, the algorithm thus selected rotates among the algorithms listed in the domain configuration file.

A concatenation of the algorithm index (which has a good degree of uniqueness) and the data of each mime body part is performed. The result of the concatenation is then hashed based using the adequate algorithm de-referenced by the algorithm index. The generated value is compared with the "bm_tpd" value found in the email header. At 636, if the values match the validation is successful then the processing continues to a TPDLogger processor at 642 in FIG. 6C, otherwise the validation errors are logged at 638 and the system halts further mail processing for this message at 640.

At 642, the TPDLogger Processor logs the TPD in a file system. In one embodiment, the name of the file is the base-64 encoded TPD. The contents of file is the complete email message. This is used to keep a log of all the brand mails processed for audit purposes. The configuration of the directory path is provided in the brand mail xml configuration. Below is an example of the XML node that is configured in the brandMailConfiguration.xml file:

```
<domain name="hp.com">
...
  <tpd-valid-directory name="/hp.com/TPD/valid/"/>
  <tpd-invalid-directory
name="/hp.com/TPD/invalid/"/>
...
</domain>
```

In one embodiment, to discern whether the brand mail system is dealing with a valid TED, a boolean attribute called "tpd-validity" is checked. The BrandMailReader in one embodiment implements the TPDValidator processor to bind this boolean email attribute with a "tpd-validity" value. In one embodiment, this Boolean attribute is bound to the mail object. If the TPD validity flag is set to true, then the brand mail system creates a TPD file entry with the complete contents of the email within the "tpd-valid-directory." If the TPD validity is false, then TPDValidation failed for the email, so a TPD file entry is created with the complete contents of the email within the "tpd-invalid-directory." If the "tpd-validity" flag is missing then the processing stops because there are errors before TPD generation.

At 622, if the TPD is valid, the processing continues to a Transport processor at 646. If the TPD validity is not found, the processing stops at 654. At 646, the Transport processor sends the branded mail to the SMTP receiver server. At 648, if the send was successful, processing stops at 654. However, if the send failed, the processing branches to ErrorHandler at 650. At 650, the ErrorHandler Processor generically handles the errors of processors. In the cases of failure, the processors add error attributes to the errors map. The errors that were populated within the map are logged by the error handler at 652.

Figure 7A:
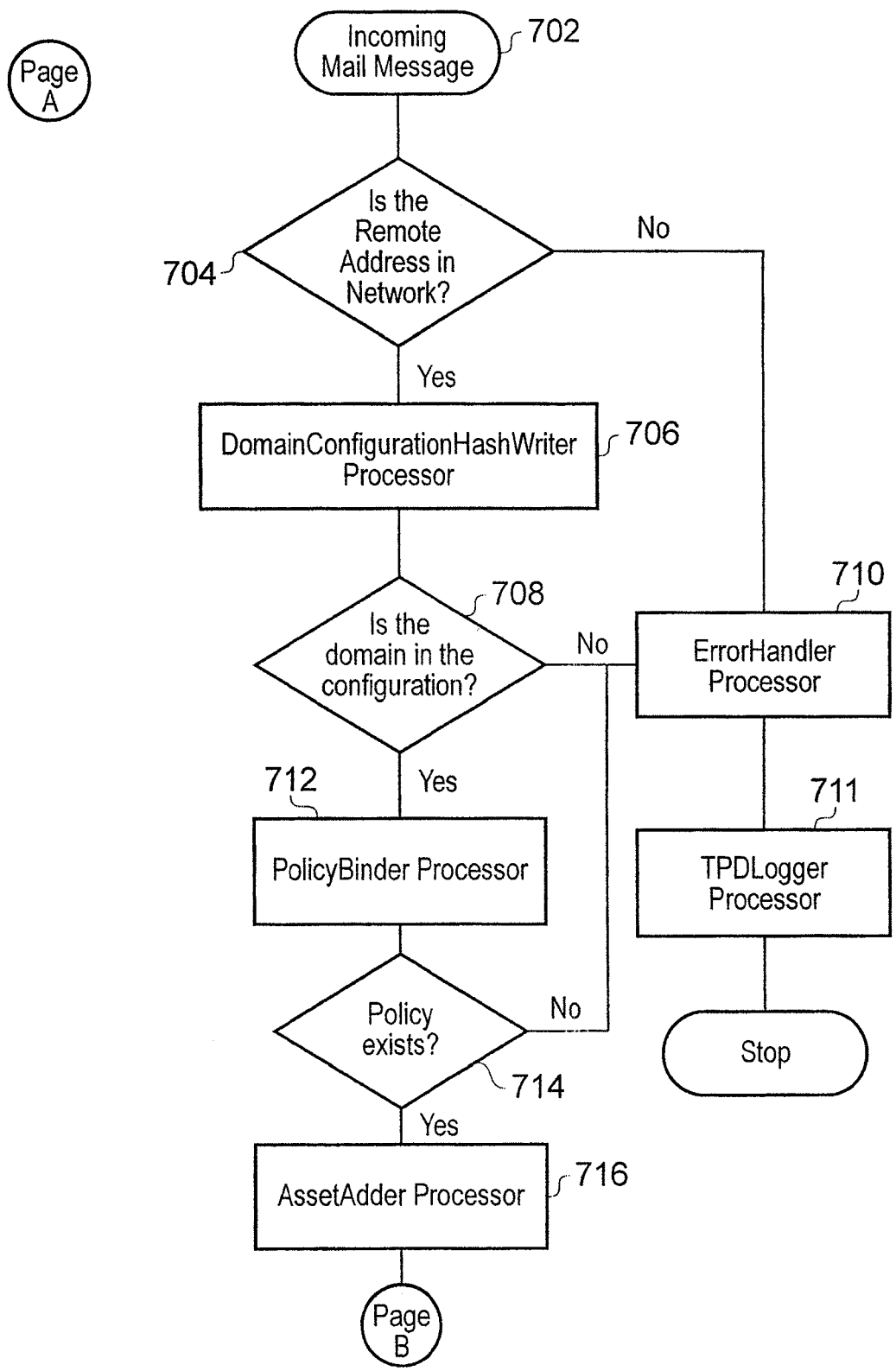
FIGS. 7A, 7B, and 7C are flow charts illustrating a BrandMailWriter of the present application in one embodiment.
Figure 7B:
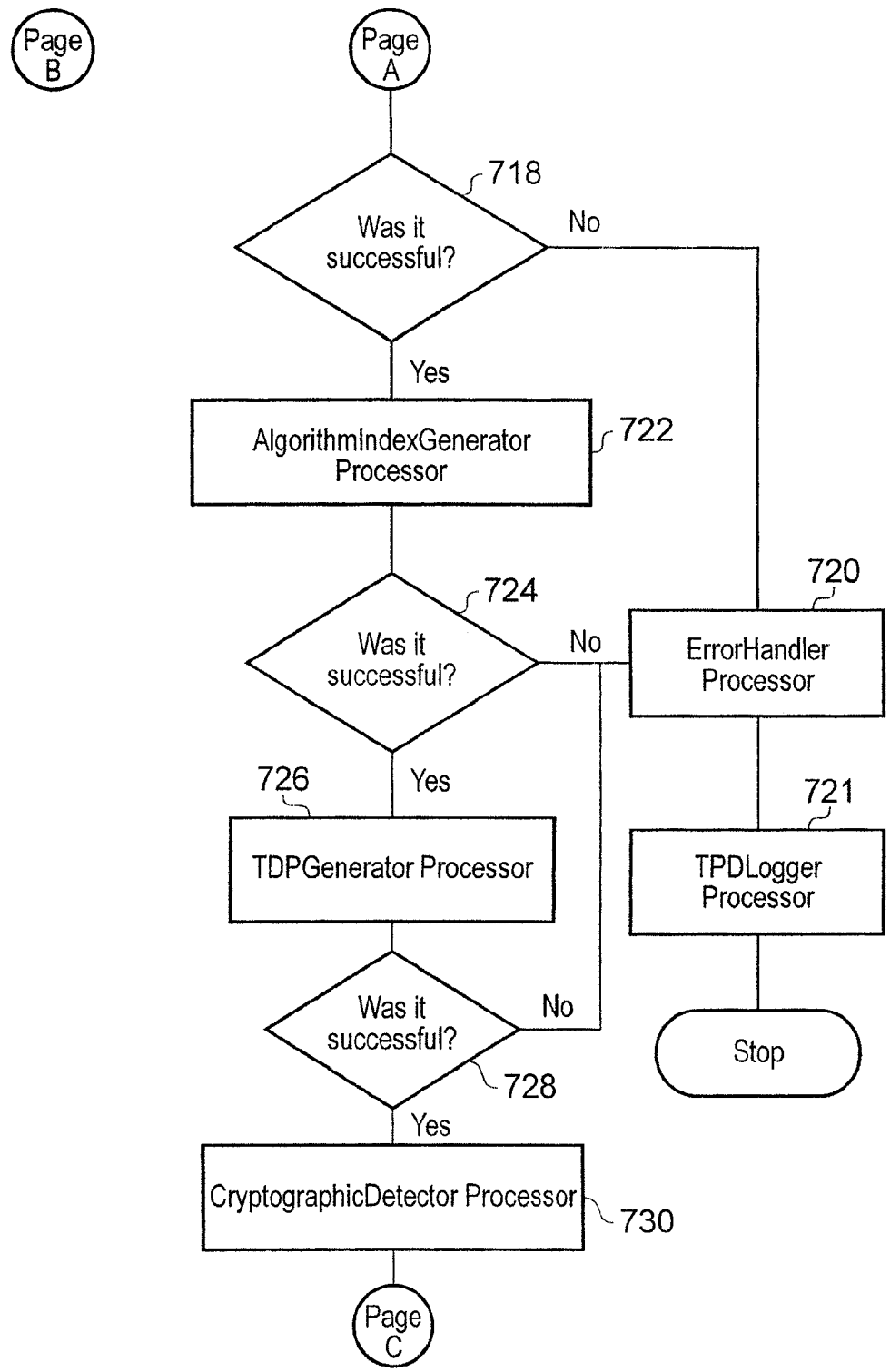
Figure 7C:
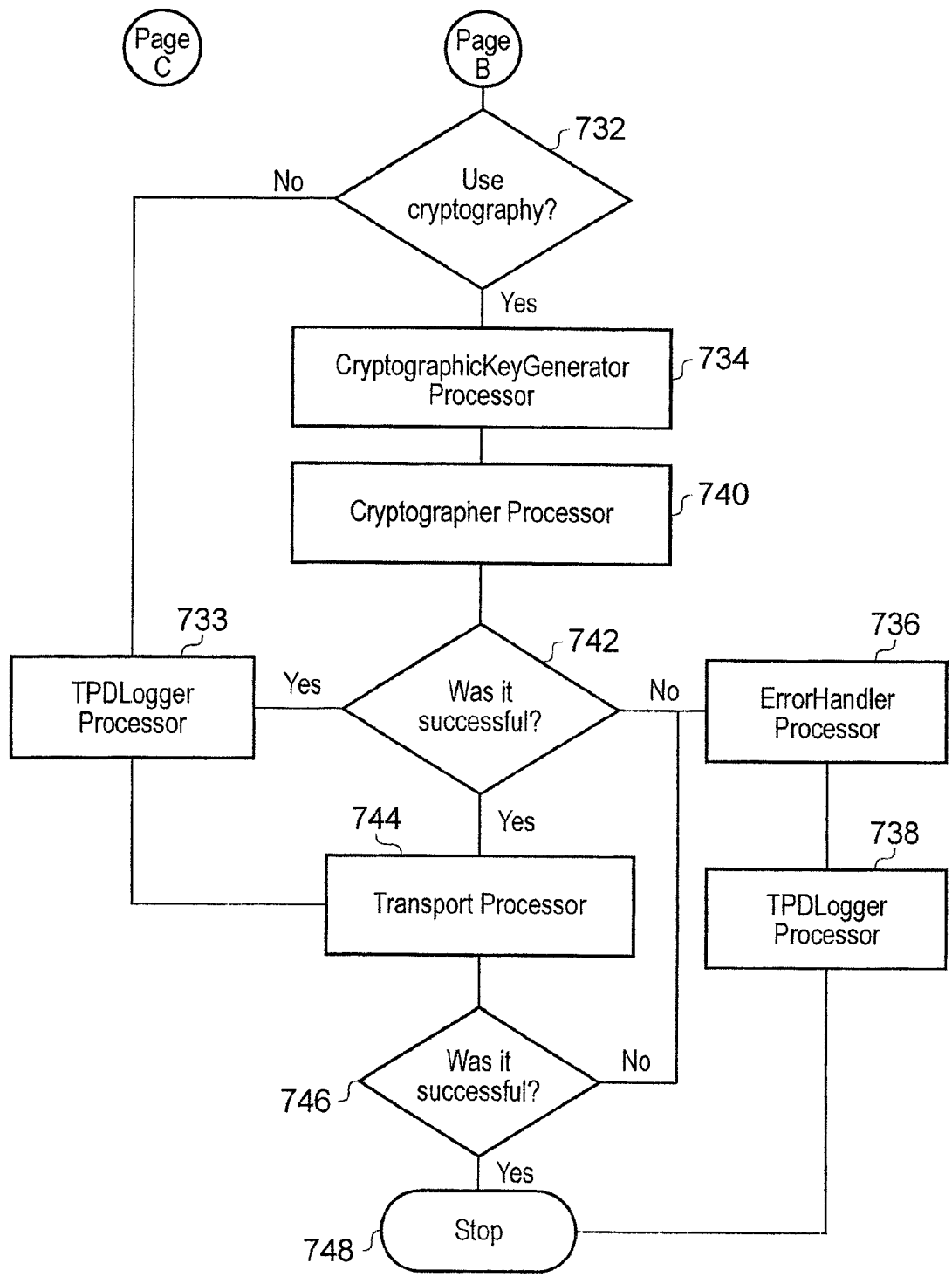

FIGS. 7A, 7B, and 7C are flow charts illustrating a BrandMailWriter of the present application in one embodiment. In one embodiment, when the BrandMailWriter application starts up, the brand mail configuration XML file is validated. If the configuration is invalid the application logs the configuration errors and exits gracefully. If the configuration is valid, the configuration data is loaded into efficient memory data structures for access during the run time mail processing.

In one embodiment, the brand mail configuration includes system wide configuration constructs as well as domain specific configuration constructs. The valid domain specific configurations are hashed and stored for a given domain. This mapping is also stored within an efficient memory data structure for run-time mail processing access. Aspects such as the ordering of hash classes, cryptographic key generation classes and cryptographic classes are preserved by the hashing of the domain specific configuration since the brand mail algorithm index dereferences the index for hashing, cryptographic key generation, and cryptography between the BrandMailWriter and reader systems.

For example, in the case of cryptography, if the algorithm index dereferences different non-corresponding algorithms for the writer and reader respectively, the decryption of the mail would be invalid due to the BrandMailReader/writer configuration mismatch. For instance, the writer would encryption with a specific algorithm in the writer while the reader would decrypt with a different algorithm. Therefore, the data would be deemed corrupted and furthermore there would not be an easy way to discern a configuration mismatch from a tampering/forging scenario. In order to make the distinction between a configuration mismatch from a tampering/forging scenario, the brand mail system of the present application checks for the equality of the configuration hashes of BrandMailReader and writer.

In one embodiment, a domain specific configuration hash is used to validate the BrandMailWriter's configuration against the BrandMailReader's configuration. The BrandMailWriter writes its configuration hash into the mail headers and the BrandMailReader validates its configuration against BrandMailWriter's value. If the values match then processing continues otherwise errors are logged and processing stops.

At 702, the BrandMailWriter in one embodiment detects or receives an incoming regular message. As an example, a regular message is sent by an email client for instance via webmail, outlook, eudora, etc. and received by the BrandMailWriter email proxy, where for example, the host name and port # is configured by the email client.

At 704, a RemoteAddressInNetwork Processor, for instance, checks whether the remote address (the address of the email client) in the network. For example, in one embodiment, permissible domains, addresses, subnets are configured within the BrandMailWriter.

If the email client is in the network, the processing continues to 706. Otherwise, processing branches to ErrorHandler Processor at 708. At 706, a DomainConfigurationHashWriter Processor, for instance, writes a header entry corresponding to the domain specific configuration hash. An example header entry is listed below:

bm_domain_config=<Base-64 domain specific configuration hash>

In one embodiment, domain specific base-64 configuration hashes are generated for all the domain configurations on application startup. The "from" email address domain, for example, appearing in a conventional electronic message fields, is used to lookup the corresponding configuration hash and subsequently the value is stored as a header entry. If the domain is not found at 708, a DomainNotFoundException is thrown at 710.

At 712, a PolicyBinder Processor for instance, gets the mapping between the "from" domain name and the base-64 encoded policy hash from the brand mail configuration and subsequently binds the policy hash as a mail processing attribute. In one embodiment, the default implementation makes use of a XML file in the file system. Below is an example of the XML node that is configured in the brandMailConfiguration.xml file:

```
<domain name="hp.com">
    ...
    <policy
    value="b8a3021de82f3e01db57b9aec4d31252"/>
    ...
</domain>
<domain name="support.hp.com">
    ...
    <policy
    value="c3d6a2ffb6e4c6a3d744d2e8b24fa1da"/>
    ...
</domain>
<domain name="dell.com">
    ...
    <policy
    value="82f3e01db57b9ab6e4c6a3d76a2ffb6e"/>
    ...
</domain>
```

The PolicyBinder processor at 712, in one embodiment, grabs the policy hash using the "from" domain as the key. This is done, for example, by invoking the method "String bindPolicy( . . . )," which returns the policy hash of interest or throws a PolicyNotFoundException if a policy hash is not found. The policy hash entry is then bound as a mail attribute. The binding in one embodiment is a mapping record between the current mail processing thread, the mail mime message, and a map of attributes.

At 714, if policy exists, the processing continues to AssetAdder Processor at 716. Otherwise, the processing branches to ErrorHandler Processor at 710 and appropriate logging at 711. At 716, the AssetAdder Processor adds the brand mail assets to the email headers by calling the "void addAssets( . . . )" method. In one embodiment, the brand mail assets are found within the brand mail configuration. The key is the "from" domain and values are sub-nodes representing the assets. Below is an example of the XML node that is configured in the brandMailConfiguration.xml file:

```
<domain name="hp.com">
    ...
    <brand-assets>
        <asset name="bm_logo"
        value="http://www.hp.com/images/hp_logo.gif"/>
        <asset name="hp_filter" value="B2B,marketing
        campaign,upsell"/>
```

```
        <asset name="hp_rating" value="classified"/>
    </brand-assets>
    ...
</domain>
<domain name="intel.com">
    ...
    <brand-assets>
        <asset name="bm_logo"
            value="http://www.intel.com/images/intel_logo.gif
            "/>
        <asset name="bm_sound_effect"
            value="http://www.intel.com/sounds/intel_sound.wa
            v"/>
    </brand-assets>
    ...
</domain>
```

In one embodiment, after adding the brand mail assets an additional header tag indicating the time the assets are written to the headers is inserted. The inserted tag's name is "bm_written_time" and is a string representation of the time in milliseconds in one embodiment. Referring to FIG. 7B, at 718 if there are problems adding the brand mail assets then a BrandMailException is thrown and the processing branches to ErrorHandler Processor at 720 and to TPDLogger Processor at 721 for appropriate error handling and logging.

It is noted that any brand asset can be defined for the given domain as long as the brand asset name is unique for the given domain. In one embodiment, a logo brand asset (for example, "bm_logo") is a standard visual brand asset that is added in the configuration.

At 722, an AlgorithmIndexGenerator Processor generates an algorithm index, for example, by concatenating the policy hash (retrieved from the mail attributes map), and all the other header entries. The result is then run through a checksum algorithm such as the CRC-32. What is returned is a long value that is then converted to a string. An example of a method used to accomplish this is a "Long generateAlgorithmIndex( . . . )". The Long checksum is converted to a string and stored within the email headers as the following header entry:

bm_index=<long checksum value as string>

The algorithm index has a degree of uniqueness based on the policy hash, and the header entries. The algorithm index is used to select the right algorithm to generate the TPD. At 724, if there are problems generating the algorithm index, then a BrandMailException is thrown and the processing branches to 720 and to TPDLogger Processor at 721 for appropriate error handling and logging. If on the other hand, an algorithm index was generated successfully, the processing continues to TPDGenerator Processor at 726.

TPDGenerator Processor in one embodiment is responsible for generating a TPD for the message. To generate a TPD for the message, this processor in one aspect makes use of the following constructs:

Algorithm index (The "bm_index" header entry which is embedded in the email headers)

The collection of registered TPD algorithms as classes implementing the Hasher interface. The classes are configured for specific domains. Below is an example of the XML node that is configured in the brandMail-Configuration.xml file:

```
<domain name="hp.com">
    ...
    <hash-classes>
        <class
        name="com.brandmail.algorithms.hash.SHA1Hasher"/>
        <class
        name="com.brandmail.algorithms.hash.MD5Hasher"/>
    </hash-classes>
    ...
</domain>
```

In one embodiment, the same order of domain specific hash classes are maintained within the configuration of the BrandMailReader. If this does not happen there may be an algorithm mismatch between the writer and the reader. In order to select the true algorithm index in the collection the following modulus operation is performed in one embodiment: bm_index % [# of registered hash classes]. Thus, the algorithm is dynamically selected using the algorithm index. Because the algorithm index is not the same for all message, the algorithm thus selected rotates among the algorithms listed in the domain configuration file. This provides the true index to dereference the appropriate hash class within the collection.

A concatenation of the algorithm index (which has a good degree of uniqueness) and the data of each mime body part is performed. The result of the concatenation is then hashed based using the adequate algorithm de-referenced by the algorithm index. The hash called TPD is base-64 encoded and stored as a header entry called: bm_tpd=<TPD> Additionally a boolean mail attribute called "tpd-validity" is bound and set to true. This will be used by the TPDLogger.

At 728, if a TPD was generated successfully, the processing continues to CryptographicDetector Processor at 730. If the TPD generation failed, the processing jumps to an ErrorHandler Processor at 720 and to TPDLogger Processor at 721 for appropriate error handling and logging. At 730, the CryptographicDetector Processor employs a cryptographic detector to invoke a method "boolean shouldApplyCryptographyForWriter( . . . )". This method first checks to see if the brand mail configuration includes a tag for cryptography for the given domain. Below is an example of the XML node that is configured in the brandMailConfiguration.xml file:

```
<domain name="hp.com">
    ...
    <use-cryptography value="true"/>
    ...
</domain>
```

If the "use-cryptography value" node is not provided or set to false, then cryptography is not used. Referring to FIG. 7C, if at 732, cryptography used, the processing branches to a CryptographicKeyGenerator Processor at 734. Otherwise, the processing continues to a TPDLogger Processor at 733.

At 734, the CryptographicKeyGenerator Processor generates a cryptographic key and binds it as a mail attribute. The cryptographic key will then be used by the cryptographer processor at 740. In one embodiment, the algorithm selection is based on the algorithm index ("bm_index" header entry). There is a collection of registered cryptographic key generation algorithms as classes implementing the CryptographicKeyGenerator interface. The classes are configured for each domain. Below is an example of the XML node that is configured in the brandMailConfiguration.xml file:

```
<domain name="hp.com">
    ...
    <cryptographic-key-generation-classes>
        <class
        name="com.brandmail.algorithms-cryptography.keyge
        neration.DivisionKeyGenerator"/>
        <class
        name="com.brandmail.algorithms.cryptography.keyge
        neration.ModulusKeyGenerator"/>
    </cryptographic-key-generation-classes>
    ...
</domain>
```

In one embodiment, the same order of the domain specific cryptographic key generation classes are maintained within the configuration of the BrandMailReader. If this does not happen there may be an algorithm mismatch between the writer and the reader. In order to select the true algorithm index in the collection the following modulus operation is performed: bm_index % [# of registered cryptographic key generation classes]
This provides a true index to dereference the appropriate cryptographic key generation class within the collection.

For example, a method "byte[ ] generateCryptographicKey( . . . )" is invoked by the selected cryptographic key generation class and the return value representing the generated key is bound as a mail attribute for the respective mail request. The mail attribute is called "cryptographic_key". This key is subsequently used by the Cryptographer processor to perform any cryptographic operations.

At 740, using the generated key, the Cryptographer Processor performs the encryption of the message. The Cryptographer Processor, for example, is responsible to encrypt the message body parts. It uses the "cryptographic_key" mail attribute as the key to encrypt the mime body parts. The algorithm selection is based on the algorithm index ("bm_index" header entry). There is a collection of registered cryptographic algorithms as classes implementing the Cryptographer interface. The classes are configured for each domain. Below is an example of the XML node that is configured in the brandMailConfiguration.xml file:

```
<domain name="hp.com">
    ...
    <cryptographic-classes>
        <class
        name="com.brandmail.algorithms.cryptography.BlowF
        ish"/>
        <class
        name="com.brandmail.algorithms.cryptography.Tripl
        eDES"/>
    </cryptographic-classes>
    ...
</domain>
```

In one embodiment, the same order of the domain specific cryptographic classes are maintained within the configuration of the BrandMailReader. If this does not happen there may be an algorithm mismatch between the writer and the reader. In order to select the true algorithm index in the collection the following modulus operation is performed: bm_index % [# of registered cryptographic classes] The algorithm is thus, dynamically selected, for example, to further enhance the security mechanism.

This gives the true index to dereference the appropriate cryptographic class within the collection. Once the cryptographic class is selected, the "byte [ ] encrypt( . . . )" method is called for all the mime body parts and finally a header entry is added indicating that cryptography was performed. The header entry is listed below: bm_cyph=true If cryptography is not used then it is not necessary to add the above tag. At 742, if the encryption procedure was failed, a BrandMailException is thrown and the processing branches to 736 for appropriate error handling. If the encryption procedure was successful, the processing continues to 733.

At 733, a TPDLogger Processor logs the TPD in the file system. The name of the file is the base-64 encoded TPD. The contents of fire is the complete email message. This is used to keep a log of all the brand mails processed for audit purposes. The configuration of the directory path is provided: in the brand mail xml configuration. Below is an example of the XML node that is configured in the brandMailConfiguration.xml file:

```
<domain name="hp.com">
    ...
    <tpd-valid-directory name="/hp.com/TPD/valid/"/>
    ...
</domain>
```

To determine whether a tpd is valid, a boolean attribute called "tpd-validity" is checked against. In one embodiment of the BrandMailWriter flow, the TPDGenerator processor will always set "tpd-validity=true", since the writer is not validating the TPD. If the TPD validity flag is set to true, then a TPD file entry is created with the complete contents of the email. The tpd-valid-directory configuration is used to write the TPD log contents to the configured location. If the "tpd-validity" flag is missing then the processing stops, because there are errors before TPD generation.

With a valid TPD, the processing continues to Transport Processor at 744. Transport Processor dispatches the created branded mail to the BrandMailWriter's SMTP sender service component. At 746, if the send is successful, the processing stops at 748. Otherwise, the processing branches to an ErrorHandler Processor at 736.

The ErrorHandler Processor at 736 generically handles the errors of processors. In the cases of failure the processors add error attributes to the errors map. The errors that were populated within the map are logged by the error handler, for instance by a TPDLogger Processor at 738.

The system and method of the present disclosure may be implemented and run on a general-purpose computer. The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:
1. An apparatus comprising instructions stored on non-transitory computer-readable media, the instructions when executed to cause at least one computer to:
receive an email message;
check a header of the received email message, in order to determine whether the received email message is to be associated with a particular brand;
if the received email message is to be associated with a particular brand, perform a security check comprising authentication of the header; and
if the header passes authentication, cause the presentation in an inbox listing of an end user of a visual distinction, the visual distinction comprising a logo obtained using a header of the received email message, the logo associated with the particular brand;
wherein
said instructions when executed are to cause the at least one computer to compare a header of the received email message with a list representing brands of respective senders to detect correspondence, in order to determine whether the received email is to be associated with the particular brand, and
the visual distinction is to denote that the received email both corresponds to a specific one of the respective senders associated with the particular brand and is secure.

2. The apparatus of claim 1, embodied as at least one of a plug-in program for an email client or as an email client program.

3. The apparatus of claim 1, wherein the visual distinction is associated with at least one of a sound that is to be played in association with the received email message or a color that is to be displayed in associated with the received email message, and wherein the instructions are to further cause a computer of the at least one computer to present the at least one to the end-user via a computer user interface.

4. The apparatus of claim 1, wherein the logo is a logo of a sender of the received email message.

5. The apparatus of claim 1, wherein the instructions when executed are further to cause the at least one computer to decrypt at least part of the received email message, and to deliver to the end user decrypted material from the received email message.

6. The apparatus of claim 1, wherein the instructions when executed are further to cause the at least one computer to perform the security check in a manner that is specific to the specific one of the senders.

7. A computer-implemented method, comprising:
receiving with a computer an email message;
checking with a computer a header of the received email message, in order to determine whether the received email message is to be associated with a particular brand;
if the received email message is to be associated with a particular brand, causing a computer to perform a security check comprising authenticating the header; and
if the header passes authentication, causing a computer to present a visual distinction as part of an inbox listing of an end user in a manner associated with the received email message, the visual distinction comprising a logo obtained using a header of the received email message, the logo associated with the particular brand;
wherein
said method further comprises comparing a header of the received email message with a list representing brands of respective senders to detect correspondence, in order to determine whether the received email is to be associated with the particular brand, and
the visual distinction is to denote that the received email both corresponds to a specific one of the respective senders associated with the particular brand and is secure.

8. The computer-implemented method of claim 7, embodied in at least one of a method of operation of a plug-in program for an email client program or as a method of operation of an email client program.

9. The computer-implemented method of claim 7, wherein the method further comprises at least one of causing a computer to play a sound in association with the email message or to display a color in associated with the received email message.

10. The computer-implemented method of claim 7, wherein the logo identifies a sender of the received email message.

11. The computer-implemented method of claim 7, further comprising:
causing a computer to check a header of the received email message in order to electronically-download the logo from a remote location.

12. The computer-implemented method of claim 7, further comprising causing a computer to determine whether the received email message is encrypted and, if so, decrypting the received email message.

13. The method of claim 7, wherein causing a computer to perform the security check includes causing a computer to perform the security check in a manner that is specific to the specific one of the senders.

14. An apparatus comprising instructions stored on non-transitory computer-readable media, the instructions when executed to cause at least one computer to:
receive an email message;
check a header of the received email message, in order to determine whether the received email message is to be associated with a particular brand;
if the received email message is to be associated with a particular brand, perform a security check comprising authentication of the header; and
if the header passes authentication, receive a logo associated with a sender of the received email message and cause the display in an inbox listing of an end user of the logo, wherein the display of the logo in associated with the received email conveys that the received email message is secure and is attributable to a source associated with the logo;
wherein said instructions when executed are to cause the at least one computer to determine whether the received email is to be associated with a particular brand by comparing a header of the received email message with a list representing brands of respective senders to detect correspondence and, if there is correspondence, associating the email with the particular brand identified by the correspondence.

15. The apparatus of claim 14, embodied as at least one of a plug-in program for an email client or as an email client program.

16. The apparatus of claim 14, wherein the logo is also associated with at least one of a sound that is to be played in association with the received email message or a color that is to be displayed in associated with the received email message, and wherein the instructions are to further cause a computer of the at least one computer to present the at least one to the end-user via a computer user interface.

17. The apparatus of claim 14, wherein the instructions when executed are to cause the at least one computer to:
check a header of the received email message in order to obtain a network destination having the logo; and
download the logo from the network destination.

18. The apparatus of claim 14, wherein the instructions when executed are further to cause the at least one computer to decrypt at least part of the received email message, and to deliver to the end user decrypted material from the received email message.

* * * * *